United States Patent
Iannone

[19]
[11] Patent Number: 6,059,497
[45] Date of Patent: May 9, 2000

[54] AIR SUSPENSION APPARATUS FOR PROTECTING A VEHICLE SUSPENSION AND CHASSIS DURING TRANSPORT OR STORAGE

[76] Inventor: Pasquale A. Iannone, 55 Dilks Rd., Monroeville, N.J. 08343

[21] Appl. No.: 09/382,840

[22] Filed: Aug. 25, 1999

[51] Int. Cl.$^7$ ..................................................... B60P 7/16
[52] U.S. Cl. .................................. 410/87; 410/4; 410/119
[58] Field of Search .............................. 410/3, 4, 87, 88, 410/119, 125, 155; 206/522; 267/64.11, 35, 294, 64.25; 296/190.07, 35.1, 65.02; 248/619, 621; 280/124.157

[56] References Cited

U.S. PATENT DOCUMENTS

| | | | |
|---|---|---|---|
| 3,161,150 | 12/1964 | Sable | 410/87 |
| 3,361,444 | 1/1968 | Harbers | 410/87 X |
| 3,401,648 | 9/1968 | Gutridge | 410/87 |
| 3,881,767 | 5/1975 | Klees | 410/87 X |
| 3,987,736 | 10/1976 | Miller | 410/119 |
| 4,227,843 | 10/1980 | Damm | 410/87 X |
| 4,310,271 | 1/1982 | Canellis et al. | 410/119 |
| 4,344,656 | 8/1982 | Masterson, Jr. et al. | 410/87 X |
| 5,678,968 | 10/1997 | Bourgeois et al. | 410/119 |
| 5,819,943 | 10/1998 | Depuy | 410/87 X |

FOREIGN PATENT DOCUMENTS

| | | | |
|---|---|---|---|
| 317375A | 5/1989 | European Pat. Off. | 410/87 |

OTHER PUBLICATIONS

Firestone Airstroke Actuators and Airmount Isolators Specification Sheet, 2 pages.

National Dragster, vol. 40, Issue 25, Jul. 9, 1999 p. 115, "The Chassis Stabilizer" advertisement, 3 pages.

National Dragster, vol. 40, Issue 25, Jul. 9, 1999 p. 123, "Chassis Saver" Advertisement, 1 page.

*Primary Examiner*—Stephen T. Gordon
*Attorney, Agent, or Firm*—John R. Mugno

[57] ABSTRACT

An air suspension apparatus for protecting a vehicle suspension and/or chassis during transport or storage is described comprising an inflatable bladder including an air valve for selectably inflating and deflating the bladder; a rigid top plate coupled to a top portion of the bladder, a rigid bottom plate coupled to the bottom portion of the bladder; a pliable, shock-absorbing top pad coupled over the top plate for engaging the vehicle thereon; and a pliable, shock-absorbing bottom pad coupled under the bottom plate for resting upon a mounting surface on which the vehicle will be transported or stored. The bottom pad will be comprised of a sufficient thickness and include an elongated slot sufficiently wide to house a hose which can be coupled to an air supply source and an air bleeder valve to efficiently inflate and deflate the rubber bladder.

13 Claims, 3 Drawing Sheets

AIR SUSPENSION APPARATUS FOR PROTECTING A VEHICLE SUSPENSION AND CHASSIS DURING TRANSPORT OR STORAGE

FIELD OF THE INVENTION

This invention is generally directed to a shock-absorbing device for protecting a suspension and/or chassis of a vehicle (e.g., a race car) during transport or storage. More specifically, an inflatable air spring bladder is incorporated to place a vehicle upon after strapping the chassis in place. After strapping the vehicle in place and upon slight inflation of the bladder, the vehicle will be secured against the restraint straps in a manner so that no damage could be done to the suspension or chassis of a vehicle.

BACKGROUND OF THE INVENTION

Race cars, particularly drag racing vehicles, require very expensive suspension and chassis systems. However, the vehicle is actually utilized on a track very infrequently as compared to the time a vehicle is either placed in storage or is in transport from track to track. It is not at all an uncommon occurrence for more damage to be done to the suspension and/or chassis of a vehicle during periods of non-racing such as during storage and transport than during racing itself.

Typically, owners transport their vehicles by means of a custom made trailer that includes D-rings on a mounting surface of the trailer to which nylon webbed ratchet straps having terminating hook clamps can be connected. In most cases, two criss-crossed ratchet straps will be connected to the front of the chassis and two criss-crossed ratchet straps will be connected to the back of the chassis to secure the vehicle in place during transport. However, due to either improper tightening of the ratchet straps or the inevitable elasticity of the ratchet straps which occurs due to shocks from movement and road conditions, a vehicle's suspension and/or chassis can experience excessive wear or be damaged, requiring expensive repairs or replacement. In fact, important races can be missed due to such damage, even if the vehicle was in satisfactory condition when it was strapped onto the trailer.

One prior art technique of providing better securement of the vehicle to a mounting surface of a trailer during transport (or during storage) is to place wood blocks underneath the chassis in one or more locations. As the chassis is secured by the ratchet straps and drawn down, the wood blocks should stop any further travel of the suspension. While this technique somewhat reduces up and down movement of the vehicle, the wood blocks tend to move causing the straps to loosen. In turn, damage to the suspension and/or chassis can result by the periodic and repeated movement of the suspension.

Another prior art device for securing a vehicle during transport (or during storage) is the use of rubber cushions upon which the suspension or chassis is placed such as that sold under the tradename CHASSIS SAVER marketed by Greg Carrillo Racing of Phoenix, Ariz. Typically, two or more rubber cushions are used. While the rubber cushions provide better shock absorption than hard wood blocks due to the pliability of their rubber composition, damage to the suspension and/or chassis can still occur.

Another prior art apparatus for protecting the suspension and/or the chassis of a vehicle is an inflatable stabilizer marketed under the tradename THE CHASSIS STABILIZER by T. C. Christner & Sons, Inc. of Quincy, Ill. Such devices are comprised of rubber bladders which may be placed under the suspension and/or chassis (typically in more than one location) and inflated after the car is strapped down. The air suspension provides an additional level of shock absorption caused by movement of the vehicle during transport. A valve and hose tube are provided to inflate the rubber bladder. However, such rubber bladders have numerous shortcomings. For instance, if catastrophic failure of the bladder occurs during transport, the suspension and/or chassis will incur a greater shock than if no device was utilized at all since there is no shock absorption except the air filled in the bladder. Furthermore, such prior art devices have been designed so that the inflation of the bladder will result in a dome-shaped bladder. Thus, unless the vehicle suspension and/or chassis is precisely aligned on the center of such devices, the vehicle can easily fall off such rubber mounts due to the curved surface of the bladder. Also, such prior art rubber bladders have proven non-useful for vehicles having a high suspension since due to their shapes, they can not be placed easily on wood blocks and the like which can be utilized to, in effect, raise the mounting surface. Furthermore, since no air gauge is provided, it is often difficult to properly attain proper inflation of the rubber bladders when in use.

Another disadvantage of prior art inflatable rubber bladders utilized to secure a vehicle during transport or storage is that, should the bladder fail and a tire becomes flat, the tire rims will be damaged since the effect would be the same as if they were lying directly on the ground. Prior art rubber bladders provide no additional rigid or pliable support, suspension and/or shock absorption besides the air injected into the rubber bladder. If the rubber bladder fails, all support is lost.

It is, therefore, a primary object of the present invention to provide a new and improved air suspension apparatus for protecting a vehicle suspension and/or chassis during transport or storage.

It is another object of the present invention to provide a new and improved air suspension apparatus for protecting a vehicle suspension and/or chassis during transport or storage utilizing an inflatable bladder that incorporates both a rigid plate (or bead) and a rubber pad.

It is yet a further object of the present invention to provide a new and improved air suspension apparatus for protecting a vehicle suspension and/or chassis during transport or storage which can be utilized regardless of the height of the suspension of the vehicle to be secured.

It is still another object of the present invention to provide a new and improved air suspension apparatus for protecting a vehicle suspension and/or chassis during transport or storage which incorporates an air pressure gauge to properly measure the level of inflation of the rubber bladder.

It is a further object of the present invention to provide a new and improved air suspension apparatus for protecting a vehicle suspension and/or chassis during transport or storage which further protects tire rims should the tires of the vehicle become flat during transport or storage.

SUMMARY OF THE INVENTION

Briefly stated and in accordance with the preferred embodiment of the invention, an air suspension apparatus for protecting a vehicle suspension and/or chassis during transport or storage is described comprising an inflatable bladder including an air valve for selectably inflating and deflating the bladder; a rigid top plate coupled to a top portion of the bladder, a rigid bottom plate coupled to the bottom portion of the bladder; a pliable, shock-absorbing top pad coupled over the top plate for engaging the vehicle thereon; and a pliable, shock-absorbing bottom pad coupled under the bottom plate for resting upon a mounting surface on which the vehicle will be transported or stored. The bottom pad will be comprised of a sufficient thickness and include an elongated slot sufficiently wide to house a hose which can be coupled to an air supply source and an air bleeder valve to efficiently inflate and deflate the rubber bladder.

BRIEF DESCRIPTION OF THE DRAWINGS

While the specification concludes with claims particularly pointing out and distinctly claiming the subject matter regarded as the invention herein, it is believed that the present invention will be more readily understood upon consideration of the description, taken in conjunction with the accompanying drawings, wherein:

DESCRIPTION OF THE PREFERRED EMBODIMENT

Figure 1:
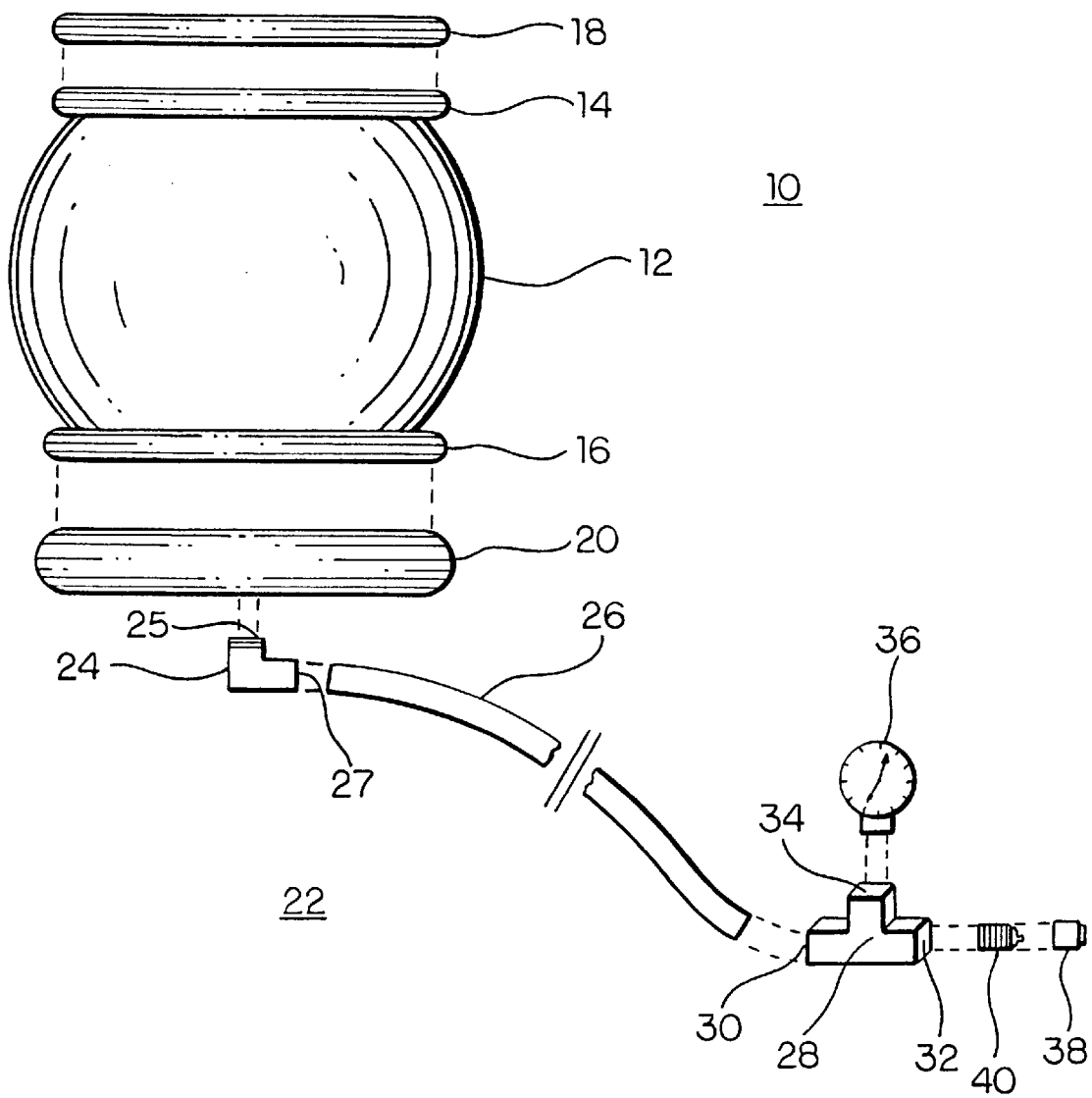
FIG. 1 is an exploded view of an air suspension apparatus for protecting a vehicle suspension and chassis during transport or storage in accordance with the preferred embodiment of the present invention.

Referring to FIG. 1, an exploded view of the air suspension apparatus of the present invention, generally designated 10, is shown. The air suspension apparatus comprises a selectively inflatable rubber bladder 12, a rigid top plate 14, and a rigid bottom plate 16. Top plate 14 and bottom plate 16, which are typically comprised of metal, are also sometimes referred to as bead plates. Furthermore, although FIG. 1 is an exploded representation of air suspension apparatus 10, top plate 14 and bottom plate 16 are drawn as an integral part of rubber bladder 12 since this is a preferred technique of ensuring the proper sealing of rubber bladder 12.

A pliable, shock-absorbing top pad 18 is coupled to, and over, top plate 14. Similarly, a pliable, shock-absorbing bottom pad 20 is coupled to, and under, bottom plate 16. The adhering of top pad 18 to top plate 14 and of bottom pad 20 to bottom plate 16 is preferably achieved by using a bonding agent such as that sold under the tradename SCOTTS GRIP which is manufactured and sold by Minnesota Mining and Manufacturing Corporation of St. Paul, Minn. However, other means for attaching top pad 18 to top plate 14 and bottom pad 20 to bottom plate 16 are possible such as the use of screws, pins, bolts and washers, etc.

Figure 2:
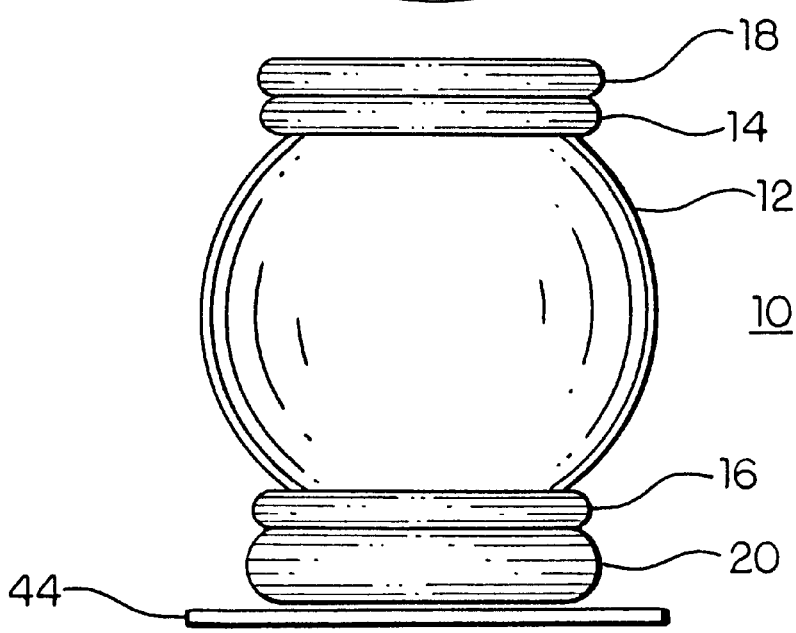
FIG. 2 is a front view of the air suspension apparatus for protecting a vehicle suspension and chassis during transport or storage of a vehicle in an inflated position excluding a hose assembly in accordance with the preferred embodiment of the present invention.

While dimensions of the various components in FIG. 1 are not critical, it will be noted that, in the preferred embodiment, top pad 18 has a thickness of ⅝ inches whereas bottom pad 20 has a thickness of 1 and ¼ inches. The larger thickness of bottom pad 20 not only provides additional shock-absorbing capabilities against the ground or mounting surface upon which the portion of bottom pad 20 will rest, but it is also provided so that a hose assembly, generally designated 22, can be coupled to rubber bladder 12 through bottom pad 20 without preventing bottom pad 20 from resting flat on the ground or a mounting surface 44 (FIG. 2). This design advantage of the subject invention will be described in further detail below in conjunction with FIGS. 2–4.

Hose assembly 22 comprises a 90 degree elbow fitting 24 which includes a fitting 25 and a fitting 27. Fitting 25 and fitting 27 may comprise various designs such as threaded bores, clamps, etc. Fitting 25 is designed to be connected to an air valve 48 (not seen in FIG. 1, but visible in FIG. 3) on the underside of rubber bladder 12 to permit rubber bladder 12 to be selectively inflated or deflated. Fitting 27 is adapted to engage the first end of a hose 26 which is of a sufficient length to extend outward from rubber bladder 12, even when inflated. A T-shaped fitting 28 has a first inlet 30 which is coupled to the second end of hose 26, a second inlet 32 which is coupled to an air tank input valve 40, and a third inlet 34 which is coupled to an air gauge 36. Air tank input valve 40 is designed to easily be attached to an air tank (not shown). Furthermore, air tank input valve 40 includes an air bleeder valve 38 which allows air to be removed from rubber bladder 12 during deflation. Air gauge 36 enables a user to determine the amount of air pressure inserted into rubber bladder 12.

In the preferred embodiment of the present invention, hose assembly 22 will be permanently coupled to rubber bladder 12 so that the means for inflating or deflating rubber bladder 12 is always available to the user. However, it will be obvious to those skilled in the art, that components such as air gauge 36 and air tank input valve 40 can be easily replaced or that hose assembly 22 can be made detachable. Furthermore, three port, T-shaped fitting 28 can be replaced with a four port (or cross) fitting so that air bleeder valve 38 can be distinctly and separately coupled to hose 26 as opposed to being attached to the same port as air tank input valve 40.

Referring now to FIG. 2, air suspension apparatus 10 is shown in an inflated position and resting on mounting surface 44. In this inflated position, a total height of 8.875 inches is attained, although other dimensions can be utilized. In the preferred embodiment, rubber bladder 12 is designed so that upon inflation the center portion of its cylindrical design will extend (and bellow) outward beyond top plate 14, bottom plate 16, top pad 18, and bottom pad 20. Through experimentation, it has been concluded that this design provides the greatest level of support when a load (e.g., a vehicle) is placed on the flat top surface of top pad 18.

Figure 3:
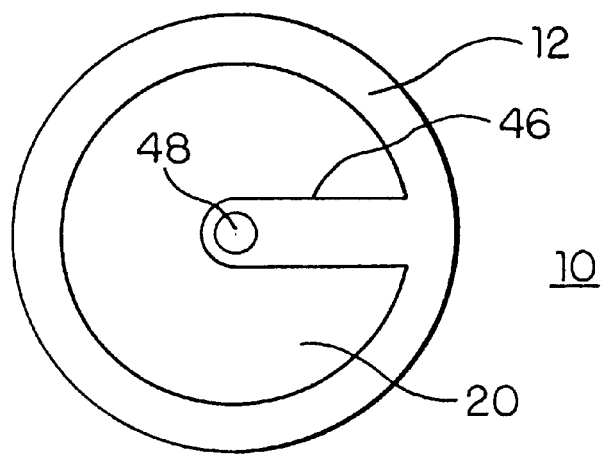
FIG. 3 is a bottom view of the air suspension apparatus for protecting a vehicle suspension and chassis during transport or storage of a vehicle in an inflated position excluding a hose assembly in accordance with the preferred embodiment of the present invention.

Referring now to FIG. 3, a bottom view of air suspension apparatus 10 is shown in an inflated position wherein rubber bladder 12 extends outward beyond the diameter of bottom pad 20. Bottom pad 20 includes an elongated slot 46 which is cut into bottom pad 20 to expose air valve 48 on the underside of rubber bladder 12. Elongated slot 46 is of a sufficient depth to enclose hose 26 in a manner so that the bottom surface of bottom pad 20 is not impacted when resting upon mounting surface 44 and no damage is done to hose 26 or pressure asserted against air valve 48.

Figure 4:
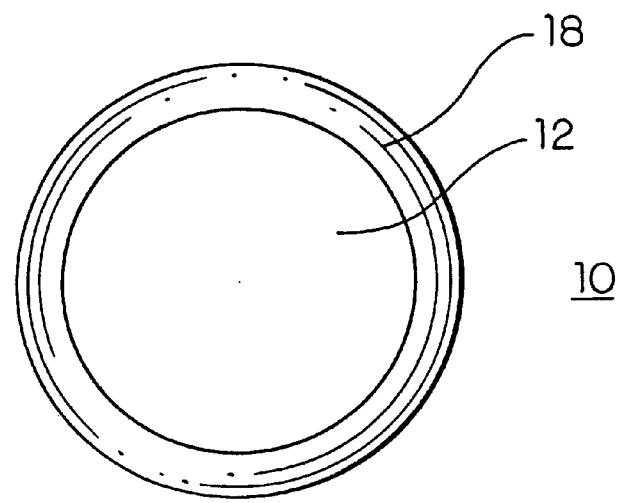
FIG. 4 is a top view of the air suspension apparatus for protecting a vehicle suspension and chassis during transport or storage of a vehicle in an inflated position excluding a hose assembly in accordance with the preferred embodiment of the present invention.

Referring now to FIG. 4, a top view of air suspension apparatus 10 is shown in an inflated position wherein rubber bladder 12 extends outwardly from top pad 18. Unlike bottom pad 20, which includes an elongated slot to house hose 26, top pad 18 has a composite flat circular top surface to efficiently receive a load (e.g., the vehicle).

Figure 5:
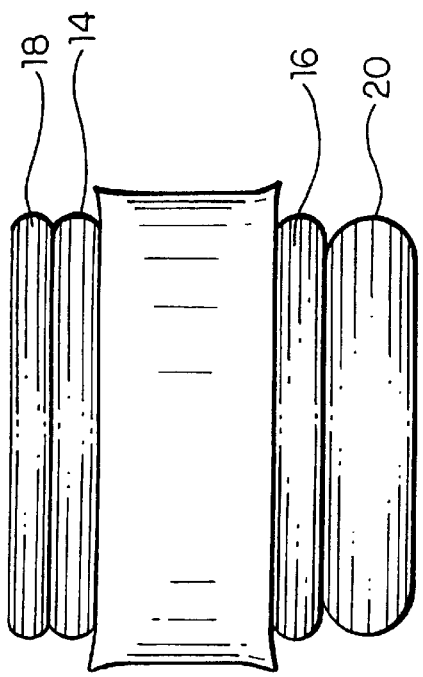
FIG. 5 is a front view of the air suspension apparatus for protecting a vehicle suspension and chassis during transport or storage of a vehicle in an deflated (or collapsed) position excluding a hose assembly in accordance with the preferred embodiment of the present invention.

Referring next to FIG. 5, air suspension apparatus 10 is shown in a deflated (or collapsed) position wherein rubber bladder 12 does not bellow nor extend outwardly as far from top plate 14, top pad 18, bottom plate 16, and bottom pad 20 as when air suspension apparatus 10 is inflated. Furthermore, in this collapsed stage, the preferred height of air suspension apparatus is 4 and ½ inches high, although other dimensions are possible. Typically, air suspension apparatus 10 would be transported or stored (when not in use) in the collapsed position of FIG. 5.

Figure 6:
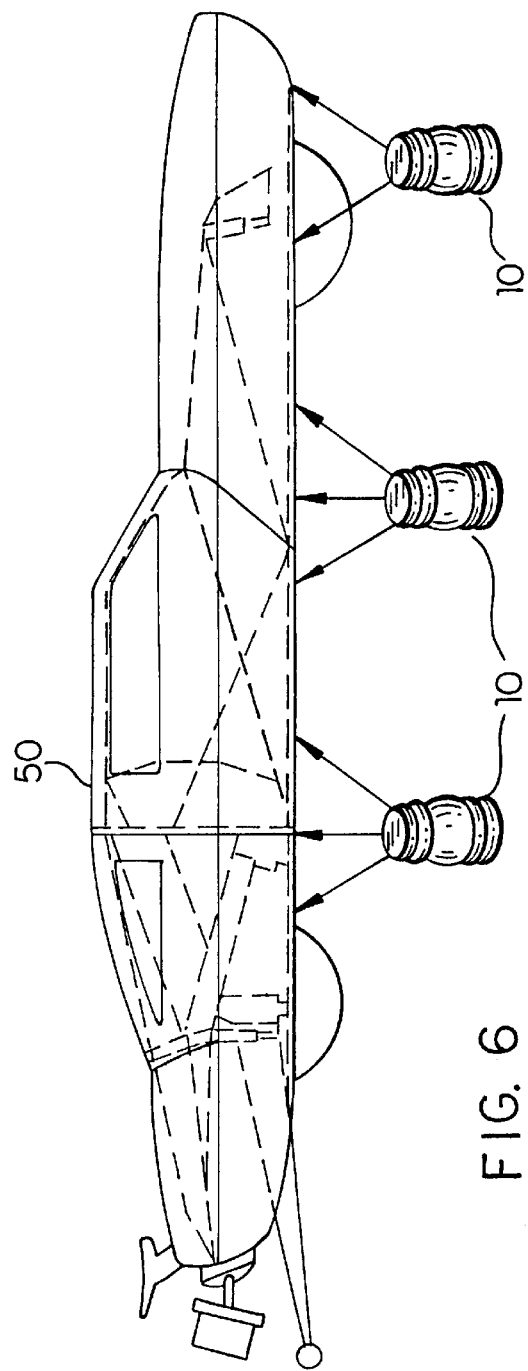
FIG. 6 is a schematic representation of alternative positions on which an air suspension apparatus for protecting a vehicle suspension and chassis during transport or storage can be placed under a vehicle in accordance with the preferred embodiment of the present invention.

Referring next to FIG. 6, a schematic illustration including a vehicle 50 is shown having three of the air suspension apparatus 10 of the present invention in view. The directional arrows in FIG. 6 demonstrate potential locations on the chassis of vehicle 50 on which apparatus 10 can be placed. In order to effectively secure vehicle 50, it is preferred that two or more of apparatus 10 will be utilized on opposing sides of vehicle 50.

Due to the combined support and shock-absorption of the rigidness of top plate 14 and bottom plate 16 together with the resilient and pliable support of top pad 18 and bottom pad 20, air suspension apparatus 10 sufficiently supports the suspension and/or chassis of vehicle 50 in a manner that no damage is caused to the vehicle. In fact, even if there is a catastrophic failure of rubber bladder 12 (i.e., rubber bladder 12 bursts), the combination of the rigid support provided by top plate 14 and bottom plate 16, and the pliable support of top pad 18 and bottom pad 20, will prevent severe damage to the suspension, chassis, or tires of vehicle 50.

The preferred technique of manufacturing air suspension apparatus 10 is to start with a rubber bladder, top plate, and bottom plate combination presently sold as actuators or isolators. For instance, the AIRSTROKE® actuator and AIRMOUNT® isolator manufactured by Firestone Industrial Products Company of Akron, Ohio are particularly suitable after adaption to manufacture air suspension apparatus 10. These devices, which are designed as load isolators and actuators, can safely handle 2,360 pounds at a design height of 4.5 inches upon inflation of 100 pounds per square inch. Much less inflation pressure is required to secure a vehicle to a mounting surface.

The air suspension apparatus 10 of the present invention will be utilized by placing at least one such device under the suspension and/or chassis of a vehicle. Nylon webbed ratchet straps will then be secured to the vehicle in a manner well known in the art. After the ratchet straps are secured in place, sufficient air will be inserted into rubber bladder 12 though hose assembly 22 so that the suspension and/or chassis is, in effect, locked in place through sufficient upward pressure from rubber bladder 12 and downward pressure from the ratchet straps so that no upward or downward movement of the suspension and/or chassis is possible. In order to free the vehicle after transport, rubber bladder 12 is deflated through air bleeder valve 38. By utilizing the present invention, costly repairs can be minimized and missed races eliminated.

It will be apparent from the foregoing description that the present invention provides a new and improved air suspension apparatus for protecting a vehicle suspension and/or chassis during transport or storage which minimizes damage incurred by periodic compression and decompression. The apparatus of the present invention is simple to manufacture and utilize.

While there have been shown and described what is presently considered to be the preferred embodiment of this invention, it will be obvious to those skilled in the art that various changes and modifications may be made without departing from the broader aspects of this invention. For instance, although the rubber bladder utilized in the preferred embodiment is cylindrical in nature, other shapes (such as rectangles) can be implemented. Furthermore, while the air valve attached to the rubber bladder has been shown as being incorporated on the underlying surface of the rubber bladder, the valve may be placed elsewhere. Also, while the preferred embodiment describes are inflatable bladder which will be injected with air, a liquid-filled bladder may also be utilized.

It is, therefore, aimed in the appended claims to cover all such changes and modifications as fall within the true scope and spirit of the invention.

I claim:

1. An apparatus for protecting the suspension and/or chassis of a vehicle while on a mounting surface during transport or storage comprising:

an inflatable bladder having a top portion and a bottom portion, and further including a valve for selectively inflating and deflating said bladder;

a rigid top plate coupled to said top portion of said bladder;

a rigid substantially flat bottom plate coupled to said bottom portion of said bladder;

a pliable, shock-absorbing top pad having a bottom surface coupled to, and over, said top plate and a top surface for engaging said vehicle thereon; and a pliable, shock-absorbing bottom pad having a top surface coupled to, and under, said bottom plate and a bottom surface for resting upon said mounting surface on which said vehicle will be transported or stored.

2. The apparatus of claim 1 wherein said bladder is generally cylindrical in shape.

3. The apparatus of claim 2 wherein said bladder bellows outward when inflated.

4. The apparatus of claim 1 wherein said top plate and said bottom plate are comprised of steel.

5. The apparatus of claim 1 wherein said top pad and said bottom pad are comprised of rubber.

6. The apparatus of claim 1 wherein said valve is on said bottom portion of said bladder.

7. The apparatus of claim 6 further comprising a hose having a first end and a second end, wherein said first end is coupled to said valve and said second end extends beyond said apparatus.

8. The apparatus of claim 7 wherein said bottom pad includes an elongated slot to house a section of said hose in a manner so that said bottom surface of said bottom pad rests flatly upon said mounting surface on which said vehicle will be transported or stored.

9. The apparatus of claim 8 further comprising a multi-port fitting having a first port, a second port and third port wherein said first port of said multi-port fitting is coupled to said second end of said hose.

10. The apparatus of claim 9 further comprising an air gauge coupled to said second port of said multi-port fitting.

11. The apparatus of claim 10 further comprising an air tank input valve coupled to said third port of said multi-port fitting.

12. The apparatus of claim 11 further comprising an air bleeder valve coupled to said hose that permits the release of air when the bladder is selectively deflated.

13. The apparatus of claim 1 wherein said top surface of said top pad is flat both when the bladder is inflated and deflated.

* * * * *